(12) United States Patent
Slusarz et al.

(10) Patent No.: US 11,719,102 B2
(45) Date of Patent: Aug. 8, 2023

(54) BLADE PROVIDED WITH A COOLING CIRCUIT

(71) Applicant: SAFRAN AIRCRAFT ENGINES, Paris (FR)

(72) Inventors: Michel Slusarz, Moissy-Cramayel (FR); Patrice Eneau, Moissy-Cramayel (FR); Charlotte Marie Dujol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 5 days.

(21) Appl. No.: 17/629,482

(22) PCT Filed: Jul. 24, 2020

(86) PCT No.: PCT/FR2020/051367
§ 371 (c)(1),
(2) Date: Jan. 24, 2022

(87) PCT Pub. No.: WO2021/019170
PCT Pub. Date: Feb. 4, 2021

(65) Prior Publication Data
US 2022/0268160 A1 Aug. 25, 2022

(30) Foreign Application Priority Data
Aug. 1, 2019 (FR) ...................................... 1908825

(51) Int. Cl.
*F01D 5/18* (2006.01)
(52) U.S. Cl.
CPC ............ *F01D 5/18* (2013.01); *F05D 2220/30* (2013.01); *F05D 2240/30* (2013.01); *F05D 2260/20* (2013.01)

(58) Field of Classification Search
CPC ......... F05D 2240/304; F05D 2250/185; F05D 2240/30; F05D 2220/30; F01D 5/186; F01D 5/187; F01D 5/18
See application file for complete search history.

(56) References Cited

U.S. PATENT DOCUMENTS 5,356,265 A * 10/1994 Kercher .................. F01D 5/186
416/97 R
7,527,475 B1 5/2009 Liang
(Continued)

FOREIGN PATENT DOCUMENTS

EP 2193859 A1 6/2010
WO 2015162389 A1 10/2015

OTHER PUBLICATIONS

French Search Report issued in French Application FR1908825 dated Jan. 14, 2020 (2 pages).
(Continued)

*Primary Examiner* — Courtney D Heinle
*Assistant Examiner* — Andrew Thanh Bui
(74) *Attorney, Agent, or Firm* — Bookoff McAndrews, PLLC

(57) ABSTRACT

A blade for a turbomachine, extending longitudinally between a base and an apex, comprising a lower surface wall, an upper surface wall, a leading edge and a trailing edge and comprising a plurality of internal ventilation cavities which form a cooling circuit of the blade, wherein at least one ventilation cavity is a ventilation cavity of a first type comprising at least one ascending portion which extends substantially longitudinally between the base and the apex, engaged with the lower surface wall and spaced from the upper surface wall, and at least one discharge portion which extends substantially transversely and which opens at the trailing edge via at least one port of the trailing edge, and wherein at least one ventilation cavity of the first (Continued)

type further comprises at least one descending portion which extends substantially longitudinally from the apex, engaged with the upper surface wall and spaced from the lower.

12 Claims, 6 Drawing Sheets

(56) References Cited

U.S. PATENT DOCUMENTS

| | | | | |
|---|---|---|---|---|
| 7,611,330 | B1 * | 11/2009 | Liang | F01D 5/187 |
| | | | | 416/97 R |
| 7,901,181 | B1 | 3/2011 | Liang | |
| 11,236,617 | B2 * | 2/2022 | Flamme | F01D 5/187 |
| 11,499,434 | B2 * | 11/2022 | Dyson | F01D 5/187 |
| 2014/0093386 | A1 | 4/2014 | Pointon et al. | |

OTHER PUBLICATIONS

International Search Report issued in International Application PCT/FR2020/051367 dated Dec. 7, 2020 with English Translation (4 pages).

* cited by examiner

[Fig. 1]
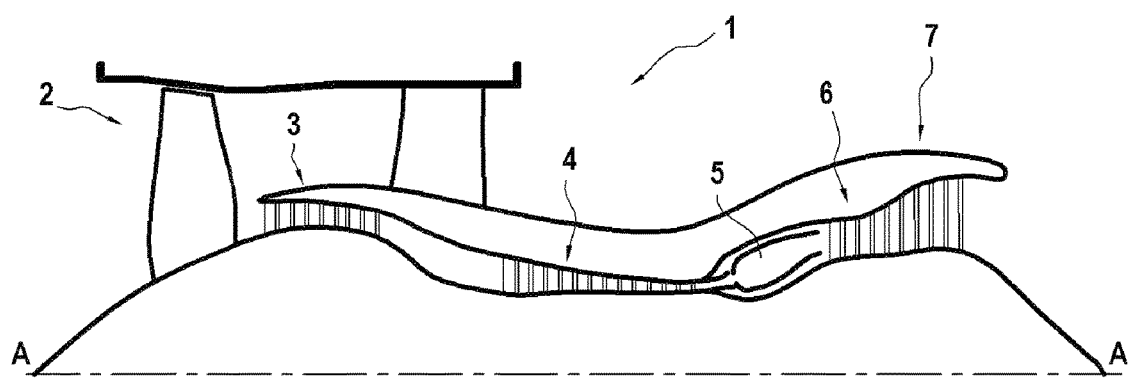
[Fig. 2]
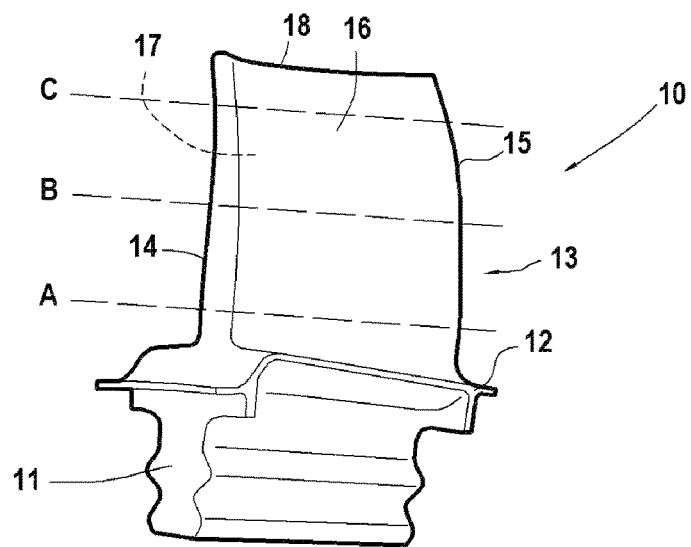

[Fig. 3]
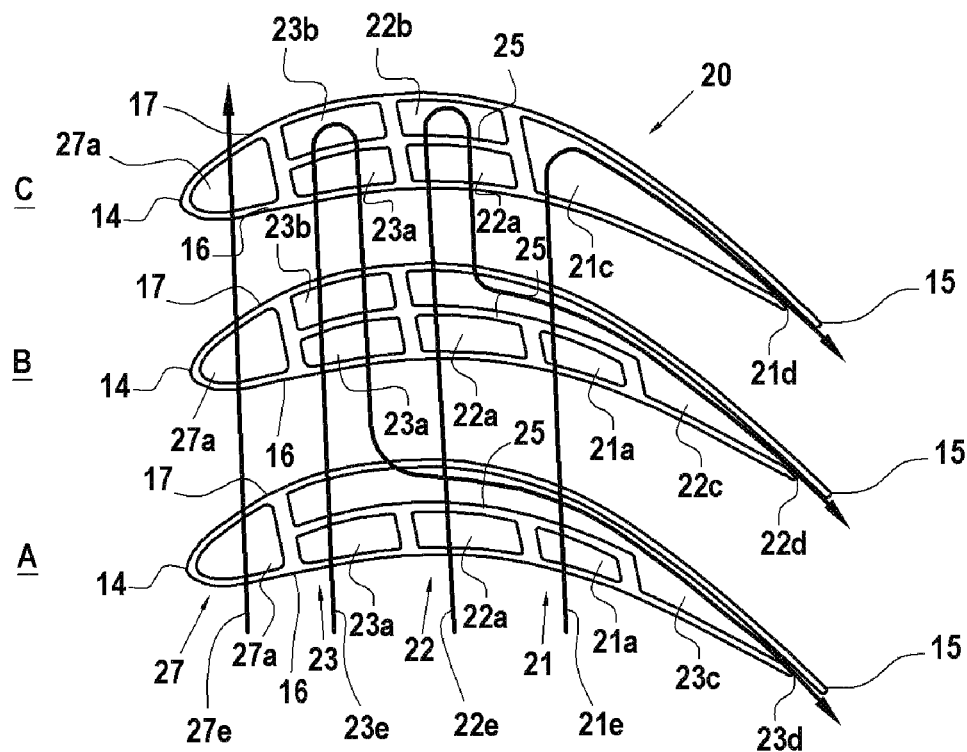
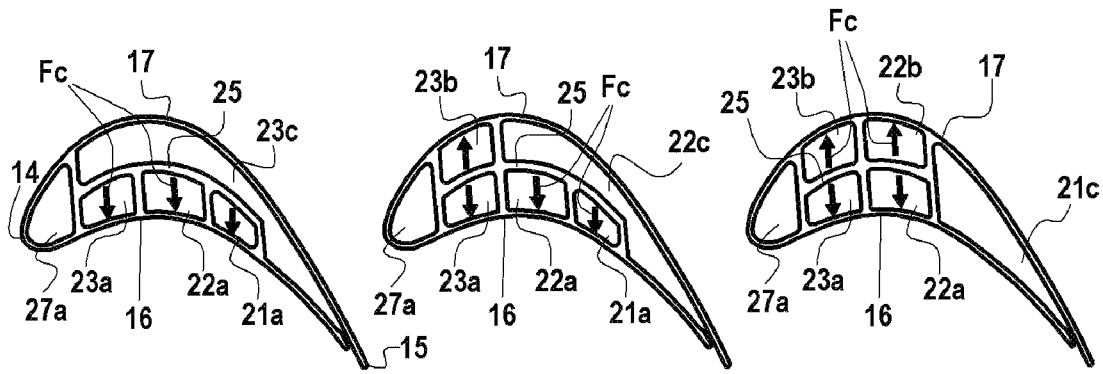
[Fig. 4A]  [Fig. 4B]  [Fig. 4C]

[Fig. 5]
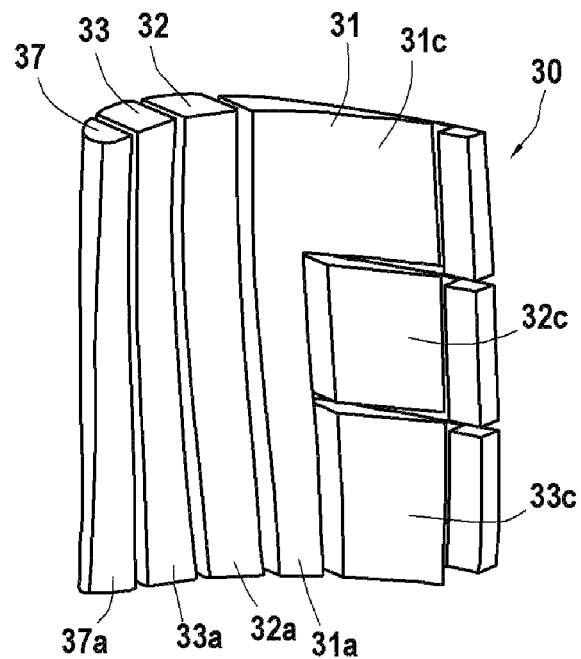
[Fig. 6]
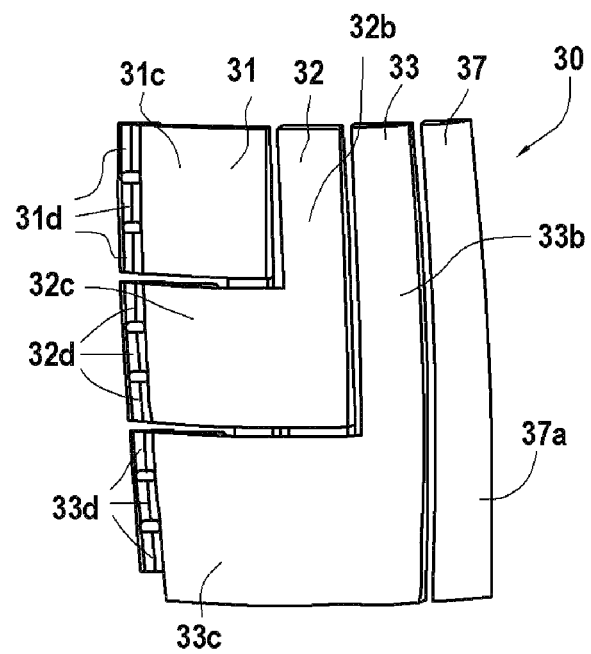

[Fig. 7]
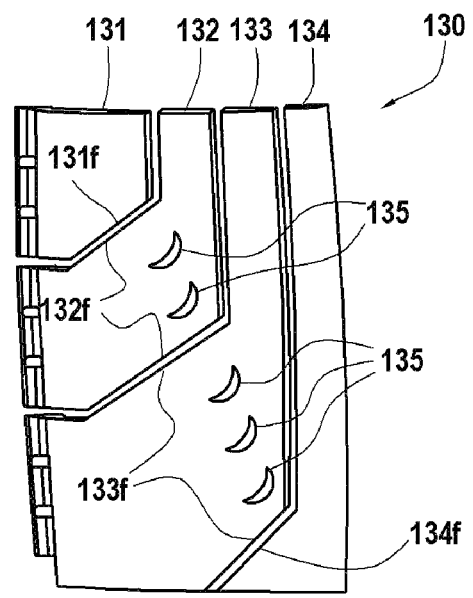
[Fig. 8]
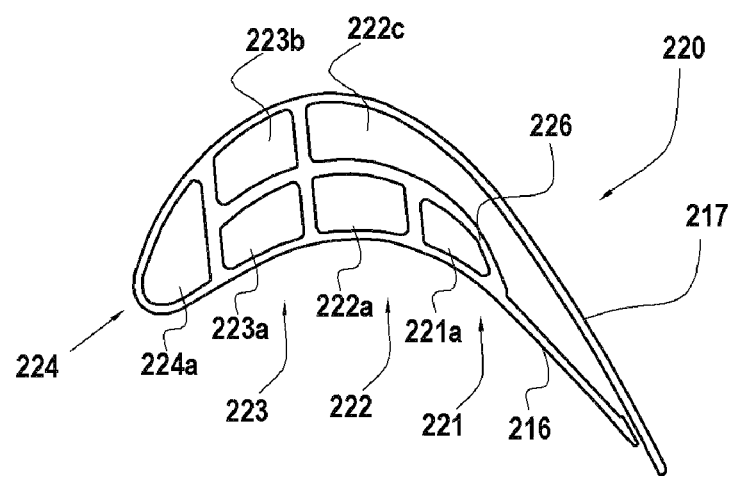

[Fig. 9]
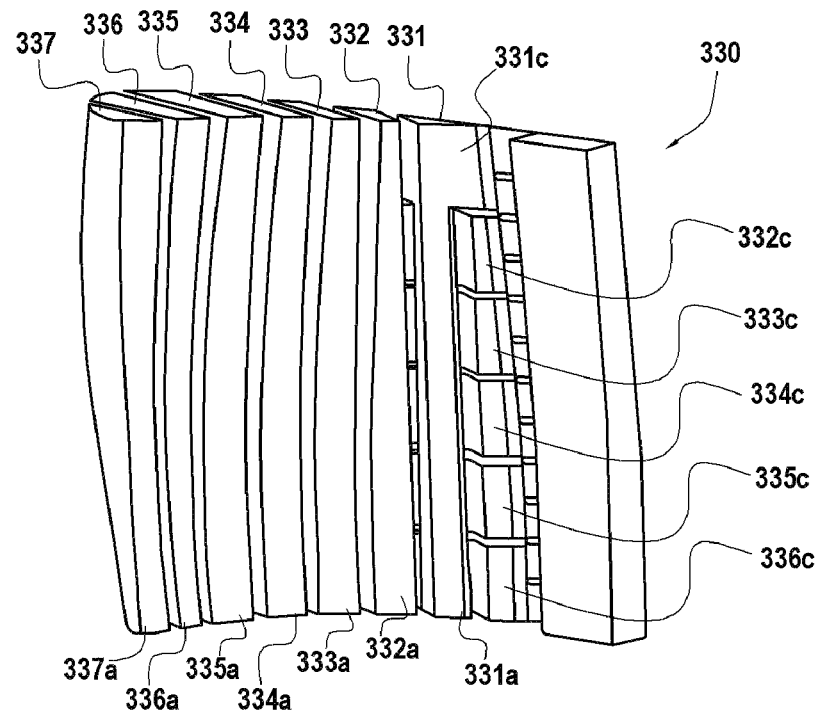
[Fig. 10]
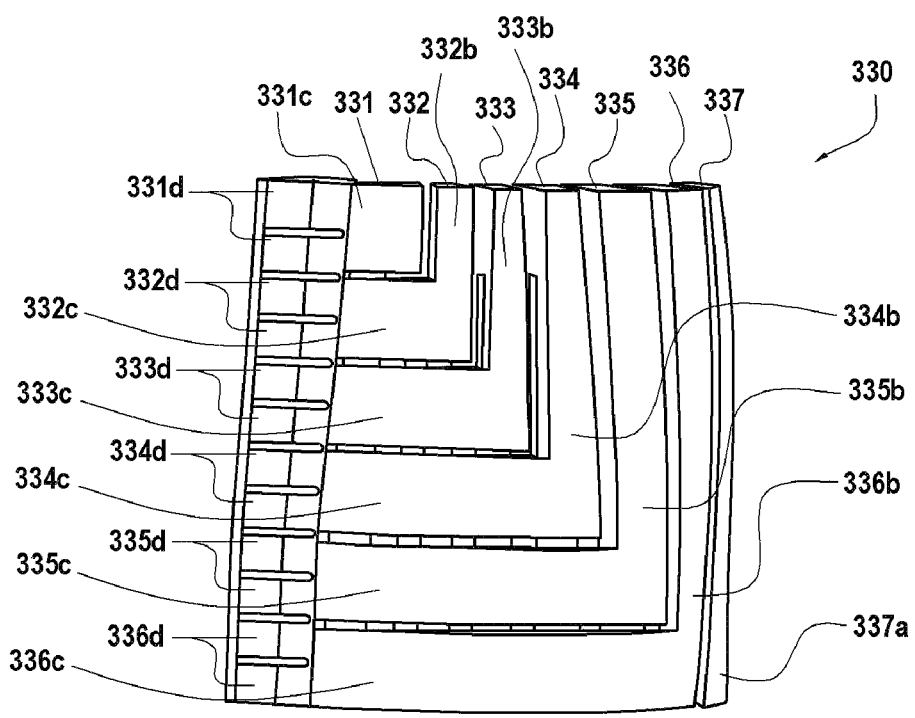

[Fig. 11]
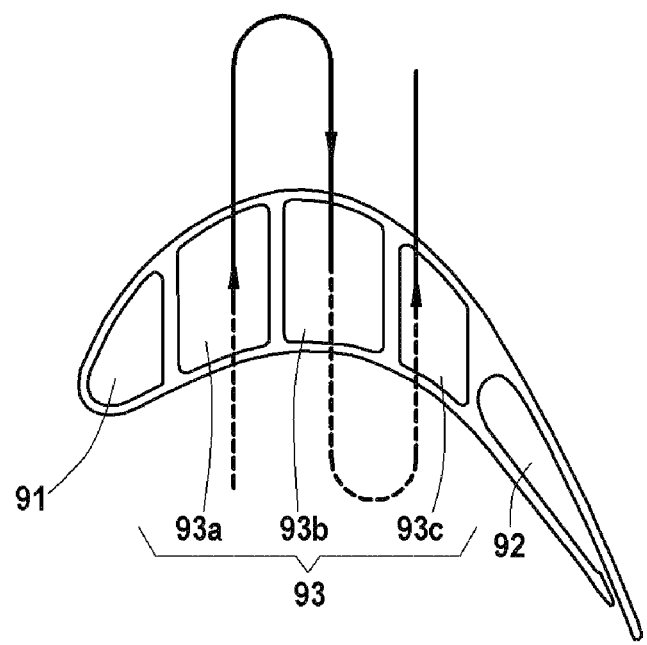

BLADE PROVIDED WITH A COOLING CIRCUIT

CROSS-REFERENCE TO RELATED APPLICATION(S)

This patent application is the U.S. National Stage entry under 35 U.S.C. § 371 of International Patent Application No. PCT/FR2020/051367, filed on Jul. 24, 2020, which claims the benefit of priority to French Patent Application No. 1908825, filed on Aug. 1, 2019, which is incorporated by reference herein in its entirety.

TECHNICAL FIELD

This disclosure relates to a blade for a turbomachine provided with a cooling circuit. It also relates to a bladed wheel, a turbine and a turbomachine comprising such a blade.

Such a blade can be used within any turbomachine module, as a fixed or movable blade; however, it is particularly adapted for high temperature environments, and therefore in particular for high pressure turbines. It can be used in any type of turbomachine, and in particular in aircraft turbojet engines.

PRIOR ART

The blades of high pressure turbines are parts subjected to high operating temperatures, above the allowable strength limits of their materials and very often even above the melting temperature of these materials.

Consequently, in order to withstand such temperatures, these blades are generally provided with an internal cooling circuit wherein cooler air taken from another location in the turbomachine circulates. Three antithetical issues arise from the proper operation of this cooling circuit: the flow path temperature, which is to be maximized to increase the efficiency of the turbine; the cooling flow, which is to be minimized to reduce losses from the turbomachine; and the life of the blades, which is to be maximized to limit the need for maintenance.

Consequently, the design of this cooling circuit, and in particular its geometry, is critical. As a result, any progress made on the latter allows to obtain gains on one or more of the above issues without conceding a hindsight on the others.

To date, a conventional cooling circuit configuration is shown in FIG. 11: it comprises an ascending cavity 91 along the leading edge, an ascending cavity 92 along the trailing edge, and a cavity called trombone 93 between the two cavities, this cavity 93 successively comprising an ascending portion 93a, a descending portion 93b then again an ascending portion 93c. Such a conventional configuration has proven its worth in the past but is now reaching its limits: it no longer allows to keep up with the increase in temperatures expected in the latest models of turbomachines being designed.

Document WO 2015/162389 is also known, which describes a variant of this conventional cooling circuit allowing to take better advantage of the Coriolis force within the cooling circuit. However, even greater progress is desired.

There is therefore a real need for a blade for a turbomachine provided with an even more efficient cooling circuit than the aforementioned known configurations.

DISCLOSURE OF THE INVENTION

The present disclosure relates to a blade for a turbomachine extending longitudinally between a base and an apex, comprising a lower surface wall, an upper surface wall, a leading edge and a trailing edge and comprising a plurality of internal ventilation cavities which form a cooling circuit of the blade, wherein at least one ventilation cavity is a ventilation cavity of a first type comprising at least one ascending portion which extends longitudinally between the base and the apex, engaged with the lower surface wall and spaced from the upper surface wall, and at least one discharge portion which extends towards and which opens at the trailing edge via at least one port of the trailing edge.

In the present disclosure, the terms "longitudinal", "transverse", "lower", "upper" and their derivatives are defined relative to the main direction of the blades, the "lower" side being on the side of the base of the blade while the "upper" side is on the side of the apex of the blade; the terms "axial", "radial", "tangential", "inner", "outer" and their derivatives are in turn defined relative to the main axis of the turbomachine; "axial plane" means a plane passing through the main axis of the turbomachine and "radial plane" means a plane perpendicular to this main axis; finally, the terms "upstream" and "downstream" are defined in relation to the circulation of air in the cooling circuit.

More particularly, "longitudinally" means that the overall direction of this portion of the cavity forms an angle less than 20° relative to the longitudinal direction. Likewise, "transversely" means that the overall direction of this portion of the cavity forms an angle less than 20° relative to the transverse plane, therefore an angle greater than 70° relative to the longitudinal direction. It will be noted on this occasion that the longitudinal direction of the blade corresponds to a radial direction of the turbomachine.

Thus, in such a cooling circuit, the trailing edge is not cooled by a single ventilation cavity, as is the case in the conventional configuration. Therefore, unlike the conventional case where a large part of the cooling flow of the trailing edge cavity is lost before reaching the apex of the cavity due to the ports of the trailing edge present all along the trailing edge, it is possible to provide a significant cooling flow, without significant loss, at all the desired levels of the trailing edge, and including at the apex of the trailing edge, therefore improving the cooling of this critical zone.

In particular, by providing several ventilation cavities of this first type, it is possible to cool in an efficient and dedicated manner several specific areas of the trailing edge.

Moreover, thanks to this ascending portion provided on the lower surface side, it is possible to make the most of the Coriolis force which thus presses the cooling air against the lower surface wall when the cooling air rises in the ascending portion while the wheel carrying the blade rotates. Thus, a greater exchange with the lower surface wall, strongly heated, is possible.

Therefore, at a given cooling rate, this blade is able to withstand higher temperatures without reducing its service life. Consequently, in the case of a high pressure turbine, such a blade will allow to increase the operating temperature of the turbine and therefore to obtain a higher efficiency.

In some embodiments, the blade comprises at least three, preferably at least five, ventilation cavities of the first type. Consequently, it is possible to cool independently, with dedicated cooling flows, several distinct areas of the trailing edge of the blade. The cooling flow passing through each port of the trailing edge is thus more finely controlled, which improves overall cooling. In particular, this reduces the temperature gradient usually present along the trailing edge. Likewise, these different ventilation cavities of the first type also allow to independently cool several distinct areas of the lower surface wall, limiting the appearance of a gradient along the lower surface wall between the leading edge and the trailing edge.

In some embodiments, at least one ventilation cavity of the first type further comprises at least one descending portion which extends longitudinally, engaged with the upper surface wall and spaced from the lower surface wall. Such a descending portion allows to cool the upper surface wall of the blade. Here again, this configuration allows to take full advantage of the Coriolis force which thus presses the cooling air against the upper surface wall when the cooling air descends in the descending portion while the wheel carrying the blade rotates. Thus, a greater exchange with the upper surface wall is possible.

In some embodiments, all the ventilation cavities of the first type comprise such a descending portion, with the exception of only one, the discharge portion of which is closest to the apex of the blade. In particular, for reasons of compactness, the latter cavity is preferably that of which the ascending portion is closest to the trailing edge.

In some embodiments, said descending portion extends after said ascending portion. Thus, cooling the lower surface wall, which is generally more thermally and mechanically critical, is favored compared to the upper surface wall, the cooling air indeed first circulating along the lower surface wall before circulating along the upper surface wall.

In some embodiments, said discharge portion extends from the lower end of said descending portion.

In some embodiments, said ascending portion and said descending portion are separated by a partition. Such an internal partition thus forms a colder central core, provided spaced from the outer walls of the blade and protected on both sides by the cooling air, which helps to strengthen the mechanical strength of the blade. This partition preferably extends along a median surface of the blade, in other words substantially parallel to the lower surface and upper surface walls, that is to say substantially parallel to the axial plane in the reference frame of the turbomachine.

In some embodiments, the ascending portion and/or the descending portion is spaced from the trailing edge. The trailing edge is therefore not cooled by this ascending and/or descending portion.

In some embodiments, the ascending portion and/or the descending portion is spaced from the leading edge. The leading edge is therefore not cooled by this ascending and/or descending portion.

In some embodiments, at least one, and preferably each, ventilation cavity of the first type is continuous and devoid of branching. This avoids dividing the cooling flow. Note that this does not exclude the possible presence of ventilation ports which open through the lower surface wall and/or the upper surface wall.

In some embodiments, at least one, and preferably each, ventilation cavity of the first type extends from the base of the blade and ends at the trailing edge. The cooling air supply can thus be done from the base of the blade.

In some embodiments, at least one, and preferably each, ventilation cavity of the first type comprises a single ascending portion. This prevents the cooling air from heating up too much before reaching the discharge section and the trailing edge.

In some embodiments, at least one ventilation cavity of the first type comprises a single descending portion. Preferably, this is the case with all ventilation cavities of the first type having such a descending portion. This prevents the cooling air from heating up too much before reaching the discharge section and the trailing edge.

In some embodiments, the cooling circuit comprises between 10 and 20 ports of the trailing edge. The number of ports of the trailing edge is selected depending on the size of the blade and the cooling requirement.

In some embodiments, each ventilation cavity of the first type comprises between 2 and 5 ports of the trailing edge. This allows a relatively fine distribution of the cooling flow between the ports of the trailing edge of the entire blade, and therefore a substantially homogeneous cooling along the trailing edge.

In some embodiments, at least one, and preferably each, port of the trailing edge is a slot extending in the direction of the trailing edge.

In some embodiments, the wall of at least one, and preferably each, ventilation cavity of the first type includes a fillet or an inclined surface at the border between its discharge portion and its substantially longitudinal immediately upstream portion. Such a fillet or such an inclined surface allows to assist the flow of cooling air at the border between the longitudinal portion and the discharge portion: the change in direction of the flow and the evolution of the passage surface are thus assisted, which allows to reduce the pressure drops at this transition.

In some embodiments, said inclined surface forms an angle comprised between 30 and 60° with the longitudinal direction.

In some embodiments, at least one, and preferably each, ventilation cavity of the first type is provided with at least one deflector at the border between its discharge portion and its substantially longitudinal immediately upstream portion. This deflector allows to assist the change in direction of the flow at the border between the longitudinal portion and the discharge portion: thus the pressure drops at this transition are reduced. Such a deflector can in particular be in the shape of a fin or a bean.

In some embodiments, the discharge portion of at least one, and preferably each, ventilation cavity of the first is devoid of a protruding ridge. This reduces the bottleneck effect which could lead to pressure drops in the circulation of the cooling air. For this purpose, it is sought to introduce a gradual change in slope of the partition separating said discharge portion from the ascending portion of the neighboring ventilation cavity: this partition is therefore preferably curved, without breaking the slope, until it intersects the lower surface wall.

In some embodiments, the discharge portion of at least one ventilation cavity of the first type has, in section in a plane perpendicular to the longitudinal direction of the blade, a generally curved profile devoid of ridge.

In some embodiments, the cooling circuit comprises a first ventilation cavity of a second type, not opening at the trailing edge, along the leading edge. The leading edge thus benefits from dedicated cooling, independent of the cooling of the trailing edge.

However, in other embodiments, a ventilation cavity of the first type could extend along the leading edge.

In some embodiments, the cooling circuit comprises a second ventilation cavity of the second type along the first ventilation cavity of the second type.

In some embodiments, at least one, and preferably each, ventilation cavity of the second type extends substantially longitudinally, engaged with both the lower surface wall and the upper surface wall.

In some embodiments, at least one, and preferably each, ventilation cavity of the second type is continuous, devoid of branching and devoid of elbow.

In some embodiments, at least one ventilation cavity is provided with ventilation ports which open through the lower surface wall and/or the upper surface wall. Such ventilation ports, distinct from the ports of the trailing edge, can be provided both for the ventilation cavities of the first type and for the ventilation cavities of the second type.

In some embodiments, at least one ventilation cavity is provided with turbulence promoters. Such turbulence promoters allow to increase the turbulence of the cooling air and therefore increase the cooling efficiency. They may in particular be disturbers, such as half-spheres or rectilinear protuberances provided on the wall to be cooled, pins or bridges connecting two walls or a wall with a partition of the cavity. Such turbulence promoters can be provided both in ventilation cavities of the first type and in ventilation cavities of the second type.

In some embodiments, the blade is configured to take place in a moving turbine wheel, preferably a high pressure turbine.

This disclosure also relates to a bladed wheel for a turbomachine module, comprising at least one blade according to any one of the preceding embodiments.

This disclosure also relates to a turbine, comprising at least one bladed wheel according to any one of the preceding embodiments.

More generally, the present disclosure also relates to a turbomachine module comprising at least one bladed wheel according to any one of the preceding embodiments.

Finally, this disclosure also relates to a turbomachine, comprising at least one bladed wheel according to any one of the preceding embodiments.

The aforementioned features and advantages, as well as others, will become apparent upon reading the following detailed description of embodiments of the proposed blade. This detailed description refers to the appended drawings.

BRIEF DESCRIPTION OF THE DRAWINGS

The appended drawings are schematic and are intended primarily to illustrate the principles of the disclosure.

In these drawings, from one figure to another, identical elements (or parts of elements) are identified by the same reference signs. Furthermore, elements (or parts of elements) belonging to different exemplary embodiments but having a similar function are identified in the figures by numerical references incremented by 100, 200, etc.

FIG. 1 is an axial sectional diagram of a turbomachine according to the disclosure.

FIG. 2 is a perspective view of a blade according to the disclosure.

FIG. 3 is a diagram illustrating the cooling air circulation through the blade of FIG. 2.

FIGS. 4A, 4B and 4C illustrate the Coriolis effect in three different planes of the blade of FIG. 2.

FIG. 5 is a view from the lower surface side of a first example of a core.

FIG. 6 is a view of the upper surface side of the first example of a core.

FIG. 7 illustrates a core according to a first variant embodiment.

FIG. 8 illustrates a cooling circuit according to a second variant embodiment.

FIG. 9 is a view from the lower surface side of a second example of a core.

FIG. 10 is a view of the upper surface side of the second example of a core.

FIG. 11 is a view illustrating a cooling circuit of the prior art.

DESCRIPTION OF THE EMBODIMENTS

In order to make the description more concrete, examples of blades are described in detail below, with reference to the appended drawings. It is recalled that the invention is not limited to these examples.

FIG. 1 shows, in section along a vertical plane passing through its main axis A, a bypass turbojet engine 1 according to the disclosure. It includes, from upstream to downstream according to the circulation of the air flow, a fan 2, a low pressure compressor 3, a high pressure compressor 4, a combustion chamber 5, a high pressure turbine 6, and a low pressure turbine 7.

FIG. 2 illustrates a movable blade 10 of the high pressure turbine 6. It comprises a fir-tree-shaped base 11, a platform 12 and a vane 13. This vane 13 comprises a leading edge 14, a trailing edge 15, a lower surface wall 16, an upper surface wall 17 and a blade head 18.

The blade 10 further comprises a cooling circuit 20 shown in FIGS. 3 and 4. More specifically, FIG. 3 superimposes three sectional views of the blade 10, along the transverse planes A, B and C of FIG. 2, and represents the circulations of the cooling air between these three planes. FIGS. 3A, 3B and 3C are placed in section planes A, B and C of FIG. 2, respectively.

In this example, the cooling circuit 20 of the blade 10 comprises three ventilation cavities of a first type 21, 22, 23 and a ventilation cavity of a second type 27.

The first ventilation cavity of the first type 21 comprises an ascending portion 21a which extends longitudinally from the blade base 11 over approximately two thirds of the height of the vane 13 then is extended by a discharge portion 21c which extends transversely from the upper end of the ascending portion 21a towards the trailing edge 15 before opening at the trailing edge 15 via at least one port of the trailing edge 21d. The ascending portion 21a is engaged with the lower surface wall 16 and spaced from the upper surface wall 17. The discharge portion 21c is engaged both with the lower surface wall 16 and with the upper surface wall 17; it extends along the upper third of the trailing edge 15.

A first cooling air flow 21e circulates in this first ventilation cavity of the first type 21: this cooling air flow 21e is supplied from the disc carrying the blade 10 through the base 11 and circulates along the ascending section 21a, then along the discharge section 21c, then finally escapes via the ports of the trailing edge 21d.

The second ventilation cavity of the first type 22 comprises an ascending portion 22a which extends longitudinally from the blade base 11 over the entire height of the vane 13 then is extended by a descending portion 22b which extends longitudinally from the upper end of the ascending portion 22a over about third the height of the vane 13 then is extended by a discharge portion 22c which extends transversely towards the trailing edge 15 before opening at the trailing edge 15 via at least one port of the trailing edge 22d. The ascending portion 22a is engaged with the lower surface wall 16 and spaced from the upper surface wall 17. The descending portion 22b is provided between the ascending portion 22a and the upper surface wall 17: it is therefore engaged with the upper surface wall 17 and spaced from the lower surface wall 16. The discharge portion 22c is firstly only engaged with the upper surface wall 17 in an upstream section along the ascending portions 2*a*, 22*a* of the first two cavities of the first type 21, 22, then engaged both with the lower surface wall 16 and with the upper surface wall 17 in a downstream section; it extends along the middle third of the trailing edge 15.

A second cooling air flow 22*e* circulates in this second ventilation cavity of the first type 22: this cooling air flow 22*e* is supplied from the disc carrying the blade 10 through the base 11 and circulates along the ascending section 22*a*, then along the descending section 22*b*, then along the discharge section 22*c*, then finally escapes via the ports of the trailing edge 22*d*.

The third ventilation cavity of the first type 23 comprises an ascending portion 23*a* which extends longitudinally from the blade base 11 over the entire height of the vane 13 then is extended by a descending portion 23*b* which extends longitudinally from the upper end of the ascending portion 23*a* over about two thirds of the height of the vane 13 then is extended by a discharge portion 23*c* which extends transversely towards the trailing edge 15 before opening at the trailing edge 15 via at least one port of the trailing edge 23*d*. The ascending portion 23*a* is engaged with the lower surface wall 16 and spaced from the upper surface wall 17. The descending portion 23*b* is provided between the ascending portion 23*a* and the upper surface wall 17: it is therefore engaged with the upper surface wall 17 and spaced from the lower surface wall 16. The discharge portion 23*c* is firstly only engaged with the upper surface wall 17 in an upstream section along the ascending portions 2*a*, 22*a*, 23*a* of the first three cavities of the first type 21, 22, 23, then engaged both with the lower surface wall 16 and with the upper surface wall 17 in a downstream section; it extends along the lower third of the trailing edge 15.

A third cooling air flow 23*e* circulates in this third ventilation cavity of the first type 23: this cooling air flow 23*e* is supplied from the disc carrying the blade 10 through the base 11 and circulates along the ascending section 23*a*, then along the descending section 23*b*, then along the discharge section 23*c*, then finally escapes via the ports of the trailing edge 23*d*.

The ventilation cavity of the second type 27 comprises a single ascending portion 27*a* which extends longitudinally from the blade base 11 over the entire height of the vane 13, along the leading edge 14.

A fourth cooling air flow 27*e* circulates in this ventilation cavity of the second type 27: this cooling air flow 27*e* is supplied from the disc carrying the blade 10 through the base 11 and circulates along the ascending section 27*a*; it escapes via small ventilation ports (not shown) provided all along the cavity 27.

Thus, the ascending portions 2*a*, 22*a*, 23*a* of the cavities of the first type 21, 22, 23 are all located engaged with the lower surface wall 16. Therefore, as can be seen in FIGS. 4A to 4C, the Coriolis force Fc tends to press the cooling air circulating radially outwards in these ascending portions 2*a*, 22*a*, 23*a* against the lower surface wall 16, which allows greater exchange with the cooling air and therefore greater cooling of the lower surface wall 16.

Likewise, the descending portions 22*b* and 23*b* are all located engaged with the upper surface wall 17. Therefore, as can be seen in FIGS. 4A to 4C, the Coriolis force Fc tends to press the cooling air circulating radially inwards in these descending portions 22*b*, 23*b* against the upper surface wall 17, which allows greater exchange with the cooling air and therefore greater cooling of the upper surface wall 17.

In addition, the presence of an internal partition 25 separating the ascending sections 2*a*, 22*a*, 23*a* of the cavities of the first type 21, 22, 23 on the one hand and the descending sections 22*b*, 23*b* or the discharge sections 22*c*, 23*c* of these same cavities 21, 22, 23 on the other hand is noticed in FIGS. 3 and 4. This partition 25, extending in the leading edge-trailing edge direction, substantially equidistant from the lower surface 16 and upper surface 17 walls, is thus spaced from the lower surface 16 and upper surface 17 walls: its operating temperature is therefore less than the outer walls 16, 17 of the blade 10.

This blade 10 is obtained by casting, in particular according to a lost wax method. The cooling circuit 20 of this blade 10 can then be obtained thanks to the core 30 shown in FIGS. 5 and 6, the latter preferably being produced by additive manufacturing. This core 30 comprises several core elements 31, 32, 33 and 37 disposed relative to each other in the desired geometry at the time of casting. Each core element 31-37 has a geometry corresponding to the negative of the geometry of one of the ventilation cavities 21-27 of the final blade 10.

Thus, similarly to the first ventilation cavity of the first type 21, the first core element 31 has a longitudinal ascending portion 31*a* and a transverse discharge portion 31*c*. In addition, it is noted in FIG. 6 that this discharge portion 31*c* has three end segments 31*d* intended to form three ports of the trailing edge 21*d*.

Similarly to the second ventilation cavity of the first type 22, the second core element 32 has a longitudinal ascending portion 32*a*, a longitudinal descending portion 32*b*, along the upper section of the ascending portion 32*a*, and a transverse discharge portion 32*c*. Here again, this discharge portion 32*c* has three end segments 32*d* intended to form three ports of the trailing edge 22*d*.

Similarly to the third ventilation cavity of the first type 23, the third core element 33 has a longitudinal ascending portion 33*a*, a longitudinal descending portion 33*b*, along the upper section of the ascending portion 33*a*, and a transverse discharge portion 33*c*. Here again, this discharge portion 33*c* has three end segments 33*d* intended to form three ports of the trailing edge 23*d*.

Finally, in turn, similarly to the ventilation cavity of the second type 27, the fourth core element 37 has a single longitudinal ascending portion 37*a*.

FIG. 7 illustrates a first variant embodiment. In this variant, the core 130 again comprises four core elements 131, 132, 133 and 137 having the same general configuration as those of the first example: thus, this core 130 allows to lead to a cooling circuit generally similar to that in FIG. 3.

However, in this first variant, the junction between the transverse portions (that is to say the discharge portions 131*c*, 132*c*, 133*c*) of the core elements 131, 132, 133 and their longitudinal portions (that is to say the ascending 131*a* or descending 132*b*, 133*b* portions as the case may be) is no longer done at right angles but through inclined surfaces 131*f*, 132*f*, 133*f*, both inside and outside the bend, if applicable. Accordingly, the cavities formed by these core elements 131, 132, 133 which are thus modified each have a passage section which gradually increases at the entrance to its discharge portion.

Therefore, in order to fill the space thus freed, and therefore continue to properly cool the entire surface of the outer walls of the blade, the fourth core element 137 also has an inclined surface 137*f* at its lower end, facing the inclined surface 133*f* of the third core element 133.

A second difference that this core 130 has in this first variant is the presence of openings 135 in the form of a crescent formed in the second and third core elements 132, 133 at the transition between the descending section 132b, 133b and the discharge section 132c, 133c of the considered core element 132, 133. These openings 135 thus result in the formation of deflectors in the ventilation cavities of the final blade facilitating the transition of direction at the inlet of the discharge portion.

FIG. 8 shows a second variant embodiment. In this variant, the cooling circuit 220 is generally similar to that of FIG. 3. However, in this variant, the geometry of the internal partition 226, separating each discharge portion 222c from the ascending portion 221a of the first ventilation cavity of the first type 221, is modified in order to reduce the bottleneck located at the border between the upstream section and the downstream section of each discharge portion 222c.

Consequently, in this variant, the same internal partition 226, which is continuous and without breaking the slope, extends from the intersection between the ascending sections 223a and 223b of the third ventilation cavity of the first type 223 and the ascending section 227a of the ventilation cavity of the second type 227, to the lower surface wall 216.

In addition, in this variant, the ascending portion 221a of the first ventilation cavity of the first type 221 has a triangular section and no longer a quadrangular section.

FIGS. 9 and 10 show a second example of a core 330 allowing to obtain a more complex cooling circuit composed of six ventilation cavities of the first type and a ventilation cavity of the second type. This core 330 comprises seven core elements 331, 332, 333, 334, 335, 336 and 337 disposed relative to each other in the desired geometry at the time of casting.

The first core element 331 has a longitudinal ascending portion 33a, and a transverse discharge portion 331c, having two end segments 331d intended to form two ports of the trailing edge.

The second to sixth core elements 332-336 are similar and each have a longitudinal ascending portion 332a-336a, a longitudinal descending portion 332b-336b, along the upper section of the ascending portion 332a-336a, and a transverse discharge portion 332c-336c. The descending portion 332b-336b of each core element 332-336 is as long as it settles away from the trailing edge. As with the first core element 331, each discharge portion 332c-336c has two end segments 332d-336d intended to form two ports of the trailing edge per ventilation cavity of the first type. Thus, in this second example, each ventilation cavity of the first type covers approximately one sixth of the length of the trailing edge.

The fourth core element 337, in turn, has a single longitudinal ascending portion 337a.

Although the present invention has been described with reference to specific embodiments, it is obvious that modifications and changes can be made to these examples without departing from the general scope of the invention as defined by the claims. In particular, individual features of the different illustrated/mentioned embodiments can be combined in additional embodiments. Consequently, the description and the drawings should be taken in an illustrative rather than a restrictive sense.

It is also obvious that all the features described with reference to a method can be transposed, alone or in combination, to a device, and conversely, all the features described with reference to a device can be transposed, alone or in combination, to a method.

The invention claimed is:

1. A blade for a turbomachine extending longitudinally between a base and an apex, comprising a lower surface wall, an upper surface wall, a leading edge and a trailing edge and comprising a plurality of internal ventilation cavities which form a cooling circuit of the blade,
   wherein several ventilation cavities are ventilation cavities of a first type comprising
      at least one ascending portion which extends longitudinally between the base and the apex, engaged with the lower surface wall and spaced from the upper surface wall, and
      at least one discharge portion which extends towards and which opens at the trailing edge via at least one port of the trailing edge, and
   wherein at least one ventilation cavity of the first type further comprises at least one descending portion which extends longitudinally from the apex engaged with the upper surface wall and spaced from the lower surface wall.

2. The blade according to claim 1, comprising at least three ventilation cavities of the first type.

3. The blade according to claim 1, wherein said discharge portion extends from the lower end of said descending portion.

4. The blade according to claim 1, wherein said ascending portion and said descending portion are separated by a partition.

5. The blade according to claim 1, wherein each ventilation cavity of the first type comprises between 2 and 5 ports of the trailing edge.

6. The blade according to claim 1, wherein the wall of at least one ventilation cavity of the first type includes a fillet or an inclined surface at the border between its discharge portion and its descending portion.

7. The blade according claim 1, wherein the discharge portion of at least one ventilation cavity of the first type has, in section in a plane perpendicular to the longitudinal direction of the blade, a generally curved profile devoid of ridge.

8. The blade according to claim 1, wherein at least one ventilation cavity of the first type is provided with at least one deflector at the border between its discharge portion and its descending portion.

9. The blade according to claim 1, wherein the cooling circuit comprises a first ventilation cavity of a second type not opening at the trailing edge, this first ventilation cavity of the second type extending along the leading edge.

10. A bladed wheel for a turbomachine module, comprising at least one blade according to claim 1.

11. A turbine, comprising at least one bladed wheel according to claim 10.

12. A turbomachine, comprising at least one bladed wheel according to claim 10.

* * * * *